Sept. 24, 1935.   H. GRIEBAT   2,015,427
TRACTOR LUG
Filed May 17, 1935
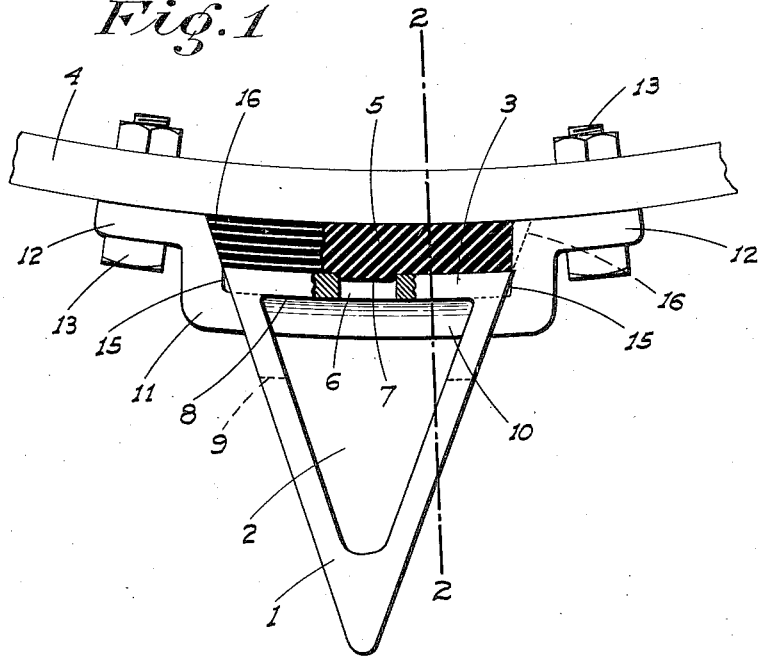
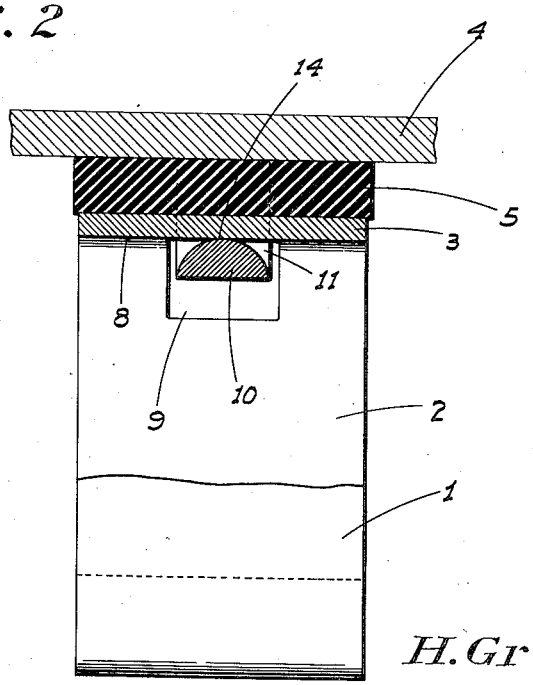
INVENTOR
H. Griebat
BY
ATTORNEY Patented Sept. 24, 1935

2,015,427

UNITED STATES PATENT OFFICE 2,015,427

TRACTOR LUG

Herman Griebat, Lodi, Calif.

Application May 17, 1935, Serial No. 21,999

6 Claims. (Cl. 301—44)

This invention relates to tractor equipment and is directed particularly and specifically to a tractor lug adapted to be attached to the rim of a tractor wheel. The tractor lug disclosed in the present invention is a modification of and improvement over the tractor lug illustrated in my United States Patent No. 1,892,945, issued January 3, 1933 and my copending application for United States Letters Patent on Tractor lug, Serial No. 4,832, filed February 4, 1935.

The principal object of the present invention is to provide a "soft riding" tractor lug which will have all the beneficial characteristics of the tractor lugs illustrated in the aforementioned United States patent and copending application for patent, but will be more simple in construction, thereby reducing the number of parts which make up the device and resulting in lower cost of production of the lugs.

As a further object it is my purpose to so construct this tractor lug that while being very simple in construction, it will be entirely "self-cleaning" whereby to prevent clogging of the lug with mud and other débris.

These objects I accomplish by means of such structure and relative arrangement of parts as will fully appear by a perusal of the following specification and claims.

In the drawing similar characters of reference indicate corresponding parts in the several views:

Figure 1 is a side elevation, partially broken out, illustrating my improved lug as attached to the rim of a tractor wheel.

Figure 2 is a transverse section on line 2—2 of Figure 1.

Referring now more particularly to the characters of reference on the drawing, the numeral 1 denotes a triangular lug having a transverse opening 2, leaving the base of the lug in the form of a relatively thin web 3.

Disposed between this web 3 and the rim 4 of the tractor wheel is a substantially rectangular resilient and tough rubber pad 5, substantially the same size as the base area of the lug.

The web 3 on both faces is concentric with the rim 4 of the tractor wheel, and is formed with a central opening 6 into which a portion of the rubber pad 5 normally projects as at 7.

Formed in each side of the lug 1 beginning at a point immediately adjacent the plane of the surface 8 of the web 3 and extending outwardly thereof is an opening 9.

Projecting through these openings 9 is a cross member 10 of an elongated U-shaped retaining bar whose legs 11 extend to the rim and are formed at their ends with ears 12 which are rigidly secured against the rim 4 by suitable bolts 13. The cross member 10 is also concentric with the rim of the wheel and normally frictionally engages against the surface 8 of the web 3. In cross section the cross member 10 is semi-circular, as illustrated in Figure 2, in the direction of the web 3, thereby having only a relatively narrow portion as at 14 in engagement with the surface 8 of the web 3 for the purpose hereinafter set out.

The openings 9 are of sufficient size lengthwise of the lug as to allow the lug to move a relatively great amount towards the rim 4 but are only sufficiently large transversely of the lug as shown in Figure 2, as to allow a slight lateral or rocking movement of said lug relative to the cross member 10. It is of course to be understood that the rubber pad is somewhat under compression when the retaining bar is secured in place.

The adjacent faces 15 of the legs of the retaining bar are parallel thereby providing a continuous and positive abutting surface for each base edge of the lug regardless of any movement of the lug towards or away from the rim. The legs also of course prevent displacement of the pad circumferentially of the rim.

To prevent lateral displacement and possible loss of the rubber pad from beneath the lug, I not only provide the opening 6 into which a portion of the rubber projects, but I also extend out the ends of the rubber pad at each end alongside the legs of the retaining bar as at 16. This prevents any lateral movement of the rubber pad relative to the retaining bar.

When in use on a tractor wheel, my improved tractor lugs will not clog with mud etc. due to the fact that when mud begins to accumulate between the cross member 10 and the web 3 of the lug, the semi-circular surface of the cross member tends to expel the mud out from the lug, thereby maintaining the same in relatively clean condition. Exteriorally of the lug the mud is also discharged from the lug about the base by the movement of the lug relative to the retaining bar 11.

A clean lug of the character disclosed always rides easier than one clogged with mud and therefore the self-cleaning feature of my lug is essential to its proper operation as a soft riding lug. Such soft riding is accomplished by providing for the lug to be movable inwardly against the rubber pad when the point of the lug engages the ground. Due to the fact that the surfaces 15 are parallel and the lower edges of the lug engage such surfaces at all times, the lug cannot shift longitudinally of the retaining bar.

Of further importance is the fact that this improved lug comprises a minimum of parts, thereby greatly reducing the cost of manufacture and facilitating the installation of the lugs on a tractor wheel.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A traction device for a wheel rim comprising a lug having opposed faces transversely of the wheel and an opening extending therethrough from face to face circumferentially of the wheel, a single U-shaped retaining bar having a relatively long cross member, said bar extending circumferentially of and being mounted on the rim of the wheel with said cross member projecting through the opening in the lug, and a resilient pad disposed between the lug and the rim.

2. A device as in claim 1 including means to retain the resilient pad between the lug and the rim.

3. A device as in claim 1 including an opening in the surface of the lug against which the pad is in contact, the adjacent portion of the pad projecting into said opening.

4. A traction device for a rim wheel comprising a hollow triangular lug, having a base web and opposed walls, openings in said opposed walls extending outwardly from the web, a U-shaped retaining bar having a relatively long cross member smaller in cross section than the size of the openings to permit movement of the lug relative to the rim, means on the rim beyond the lug to secure said bar to the rim, said cross member projecting through the openings in the lug, and a resilient pad secured between the web of the lug and the rim.

5. A device as in claim 4 in which the cross member of the retaining bar engages against the web, said cross member being convexly curved in cross section on the side engaging the web.

6. A device as in claim 4 in which the openings in the sides of the lugs are of greater depth than the cross member, and in which the cross member engages against the web of the lug whereby the lug cannot move outward of the rim but can move inward a certain distance.

HERMAN GRIEBAT.